Jan. 18, 1927.
J. A. DEWIRE
1,614,603
SELF LOCKING GEAR SHIFT LEVER BALL
Filed Oct. 19, 1925
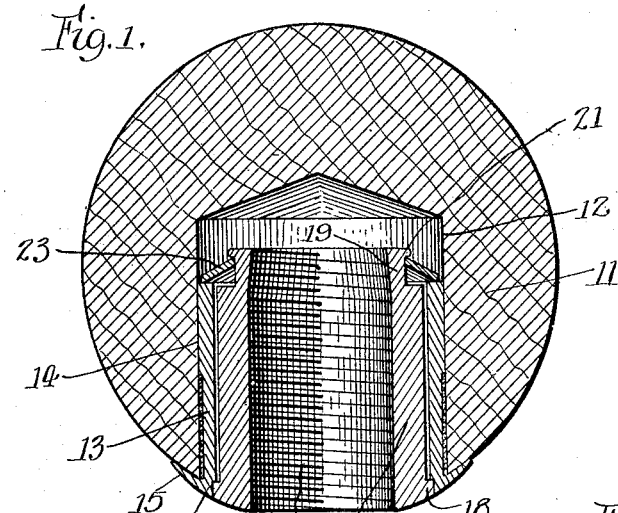
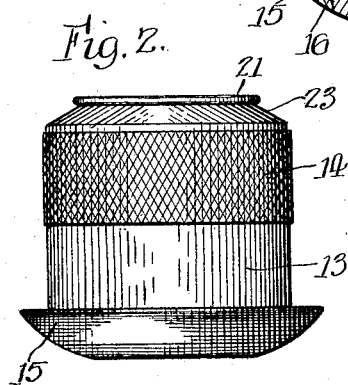
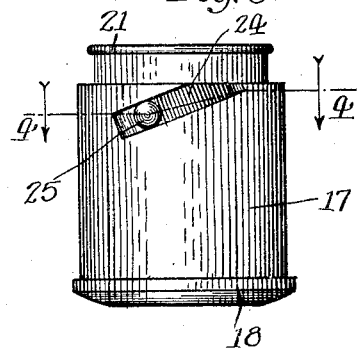
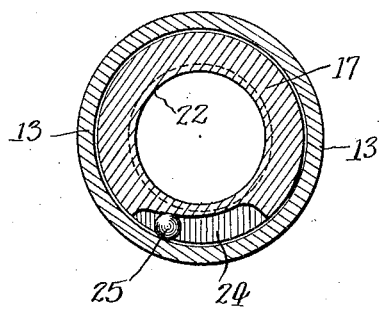
Witness:
A. J. Sauser.
Inventor:
John A. Dewire
By Walter M. Fuller
Atty.

Patented Jan. 18, 1927.

1,614,603

UNITED STATES PATENT OFFICE.

JOHN A. DEWIRE, OF CHICAGO, ILLINOIS, ASSIGNOR TO THE KINGSLEY-MILLER COMPANY, OF CHICAGO, ILLINOIS, A CORPORATION OF ILLINOIS.

SELF-LOCKING GEAR-SHIFT-LEVER BALL.

Application filed October 19, 1925. Serial No. 63,258.

The present invention concerns features of novelty and advantage, both structural and functional, in mountings for balls, knobs, or the like on their supports, and relates more particularly, but not exclusively, to improved means of this character for the balls used on the top ends of the gear-shift levers of automobiles.

Such balls are frequently made of attractive onyx or other suitable relatively expensive material and the new mounting is designed, among other things, to prevent the theft of such articles by locking the balls on the levers permanently, hence precluding demounting or detachment.

A further aim or purpose of the invention is to supply a structure or device of this type which can be made at low cost because of the comparatively few parts involved, and which is unlikely to become damaged or injured in ordinary service.

An added object of the invention is to provide an appliance of this character which can be sold as a separate unit hence avoiding the necessity of selling independent parts to be assembled by the purchaser or user.

In the annexed drawing, forming a part of this specification, and to which reference should be had for a complete understanding of the invention and its several advantages, a present preferred embodiment of such invention has been illustrated and for simplicity the same parts of the structure have been supplied with like reference characters throughout the several views.

In this drawing:

Figure 1 is a central section through the ball and its mounting inside of it;

Figure 2 is an elevation of the mounting itself before it is cemented in the cavity of the ball;

Figure 3 is an elevation of the adapter forming part of the mounting; and

Figure 4 is a fragmentary section on line 4—4 of Figure 3.

By reference to this drawing, it will be seen that the onyx or other ball or knob 11 has a cylindrical cavity 12 therein extending inwardly from its curved outer surface.

The mounting includes a bushing or sleeve 13 of substantially the same external diameter as the internal caliber of the cylindrical recess 12 of the ball, such bushing being of less length than the depth of the cavity, having a portion of its outer surface knurled or roughened at 14 to permit it to be more securely cemented in the ball, and having at its outer end a flange 15 overlapping and concealing that part of the outer face of the ball around the margin of the cavity and which is likely to be somewhat chipped during the production of the socket in the ball, such bushing also at its outer end having a slight annular depression or groove 16 providing a shallow shoulder.

The cylindrical companion tubular adapter 17 has its outer end shaped to conform to the curvature of the ball and it has a small flange 18 located in the groove 16 which construction limits the inward movement of the adapter relatively to the ball cavity and its bushing.

At its other end, beyond the corresponding end of the sleeve or bushing, the adapter has a reduced diameter section 19 terminating in a small annular flange or head 21, this construction thus providing an annular external groove around such adapter.

As is clearly shown, the interior of the adapted is screw-threaded at 22 whereby it may be easily and firmly screwed on to the threaded upper end of a gear-shift lever.

To prevent the ball from being lifted off of its encased adapter and to apply suitable pressure or friction between the parts, a bevelled, flaring or converging, resilient ring or cupped spring washer 23 is located in the groove of the adapter formed by its section of lesser diameter, this ring or washer extending outwardly over the adjacent end of the bushing, as shown in Figure 1, hence constituting an effective lock or holding device to prevent separation of the parts.

In other words, the bushing having been fixedly cemented in the ball, the spring or washer acts to prevent the latter from being removed or demounted from the adapter.

On its outer face, the adapter has an oblique or angularly-disposed groove 24 of graduated depth, its greatest depth nearest its inner or upper end being adequate to completely accommodate the clutch-ball 25 located in the groove, the shallowest part of the latter at its other or lower end, however, being incapable of such complete accommodation, Assuming that the bushing has been slipped over the adapter, the spring or resilient ring or washer, after such telescopic assembly, is applied to the reduced part 19 of the adapter and the exposed end portion of the latter is swedged or spun over the washer forming the shoulder 21, whereby the desired amount of tension or friction is produced to give the needed resistance to the turning of the ball on this support.

Hence the ball cannot revolve freely although it is nevertheless capable of rotation.

The parts having been thus assembled, they are ready as a unit for cementing in the ball cavity.

The new structure is ordinarily sold in the assembled condition specified and when the purchaser desires to apply the ball to the gear-shift lever of his car, he merely turns the ball in the right direction and the internal adapter is rotated likewise by reason of the ball-clutch connection between the two, thus enabling the operator to screw the adapter on to the lever with ease and dispatch.

If, however, the onyx ball or knob is turned in the opposite direction, in an attempt to unscrew it and the adapter from the lever, the ball will turn on the adapter and the clutch will be inoperative, such movement of the ball and bushing retracting the clutch-ball into the upper deeper part of its groove and hence breaking the operative connection between the bushing and the adapter.

Thus the adapter remains firmly screwed on the lever regardless of the manipulation of the onyx ball or knob and the latter cannot be removed or demounted from the adapter.

Hence, when the structure has once been correctly applied to its supporting lever, it is there permanently, thus precluding its unauthorized removal or theft.

This invention is not limited and restricted to the precise and exact details of structure illustrated and described because these may be modified within comparatively wide limits without departure from the invention as defined by the appended claim and without the sacrifice of any of its substantial benefits and advantages.

I claim:

In a structure of the character described, the combination of a recessed ball, a bushing secured in said recess, an externally-grooved adapter designed to be screwed on to a threaded support, a resilient washer accommodated in part in said adapter groove and cooperating with said bushing to prevent the ball and bushing from being slid off of said adapter, and a one-way rotary clutch between said bushing and adapter.

In witness whereof I have hereunto set my hand and seal.

JOHN A. DEWIRE. [L.S.]